(12) United States Patent
Busuioc et al.

(10) Patent No.: US 12,443,636 B1
(45) Date of Patent: Oct. 14, 2025

(54) DOMAIN INTERFACE ENGINE(S) FOR VIRTUAL ASSISTANT APPLICATIONS

(71) Applicant: Oracle International Corporation, Redwood City, CA (US)

(72) Inventors: Laurentiu Busuioc, Alameda, CA (US); Kishan Kumar Agrawal, Fremont, CA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 18/617,285

(22) Filed: Mar. 26, 2024

(51) Int. Cl.
*G06F 7/00* (2006.01)
*G06F 16/3331* (2025.01)
*G06F 16/335* (2019.01)

(52) U.S. Cl.
CPC ........ *G06F 16/3331* (2019.01); *G06F 16/335* (2019.01)

(58) Field of Classification Search
CPC .. G06F 16/3331; G06F 16/335; G06F 16/334; G06F 16/9535; G06F 16/24578; G06F 16/248; G06F 16/951; G06F 16/3344; G06F 16/3329; G06F 16/245; G06F 16/9032; G06F 40/30; G06F 40/35; G06F 40/216; G06F 40/284

See application file for complete search history.

(56) References Cited

U.S. PATENT DOCUMENTS

| | | | |
|---|---|---|---|
| 2018/0337872 A1* | 11/2018 | Fawcett | G06F 8/31 |
| 2020/0320133 A1* | 10/2020 | Yaramada | G06F 40/35 |
| 2024/0386313 A1* | 11/2024 | Pedersen | G06N 20/00 |
| 2025/0013677 A1* | 1/2025 | James | G06F 16/3329 |

* cited by examiner

*Primary Examiner* — Mohammad A Sana

(57) ABSTRACT

Various embodiments of the present technology generally relate to systems and methods for providing a domain interface engine for virtual assistant applications. In an example, a method includes receiving, by a domain interface engine, a user query from a first client device. The domain interface engine may include multiple microbots, each of which is assigned to a respective backend domain. The domain interface engine may determine a first microbot for handling the user query. The first microbot may be assigned to a first backend domain and may retrieve a domain content from the first backend domain corresponding to the user query. The first microbot may also generate a query response based on the domain content and the domain interface engine may transmit the query response to the first client device.

20 Claims, 7 Drawing Sheets

DOMAIN INTERFACE ENGINE(S) FOR VIRTUAL ASSISTANT APPLICATIONS

TECHNICAL FIELD

Various embodiments of the present technology generally relate to virtual assistant applications ("VA applications"). More specifically, embodiments of the present technology relate to systems and methods for providing domain interface engine(s) for development and deployment of VA applications.

BACKGROUND

Virtual assistants are rapidly gaining popularity and becoming indispensable tools for organizations across various industries. With advancements in natural language processing (NLP) and artificial intelligence (AI), virtual assistants are now capable of understanding and responding to human queries and commands with remarkable accuracy and efficiency. As a result, organizations are leveraging virtual assistants to streamline operations, enhance customer service, and improve productivity. From automating routine tasks and providing instant access to information to facilitating seamless communication and collaboration, virtual assistants are transforming the way businesses operate. By empowering users to interact with systems and services using natural language interfaces, virtual assistants are popularizing access to technology and enabling organizations to leverage the power of AI to drive innovation and achieve their business objectives. As the capabilities of virtual assistants continue to evolve and expand, they are poised to play an increasingly vital role in shaping the future of work and driving digital transformation across industries.

However, conventional designs of VA applications encounter a range of challenges, with some stemming from the monolithic architecture they adhere to. In a monolithic architecture, the infrastructure-as-a-service (IaaS), platform-as-a-service (PaaS), and software-as-a-service (SaaS) components of the VA application are tightly coupled and built upon one another. In this monolithic approach, all functionalities and services of the virtual assistant, including natural language processing (NLP), dialogue management, integration with external services, and user interface, are bundled together within a single, interconnected system. While this design simplifies development and deployment in some respects, it also presents challenges in terms of scalability, flexibility, and maintenance. Any updates or changes to one part of the application can necessitate modifications across the entire monolith, making it difficult to iterate quickly and adapt to evolving requirements. Additionally, the tightly coupled nature of monolithic architectures can hinder the isolation and scalability of individual components, limiting the ability to scale the application horizontally or deploy new features independently.

Accordingly, there exists a need for domain interface engine(s) that provide improved approaches and architectures for VA applications. In particular, the domain interface engine(s) provided herein provide more modular and decoupled architectures that offer greater flexibility, scalability, and maintainability for VA applications.

The information provided in this section is presented as background information and serves only to assist in any understanding of the present disclosure. No determination has been made and no assertion is made as to whether any of the above might be applicable as prior art with regard to the present disclosure.

Overview

Technology is disclosed herein for systems and techniques for providing domain interface engines. In an aspect, a domain interface engine is provided having multiple microbots. Each microbot may be assigned to a respective backend domain containing domain content. When a VA application receives a user query, the domain interface engine may determine a microbot to handle the user query. In some cases, the domain interface engine may determine a user intent from the user query and based on the user intent determine a microbot to handle the user query. The microbot selected to handle the user query may be selected based on the backend domain to which the microbot is assigned.

Upon receipt of the user query, the microbot may perform one or more filtering steps to remove restricted content from the user query. Then the microbot may generate a domain request and transmit the domain request to the backend domain to retrieve domain content from the backend domain corresponding to the user query. The backend domain may provide a domain response to the microbot responsive to receiving the domain request. The domain response may contain domain content associated with the user query, such as an answer to a question within the user query.

The domain interface engine may validate the domain response in view of the user query. Once the domain response is validated, the domain interface engine may generate a query response based on the domain response. The query response may contain a response to the user query. The domain interface engine may transmit the query response to a client device associated with the querying user as a user response.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

The accompanying drawings, which are incorporated into and constitute a part of this specification, illustrate one or more certain aspects and, together with the description of the example, serve to explain the principles and implementations of the certain examples.

Figure 1:
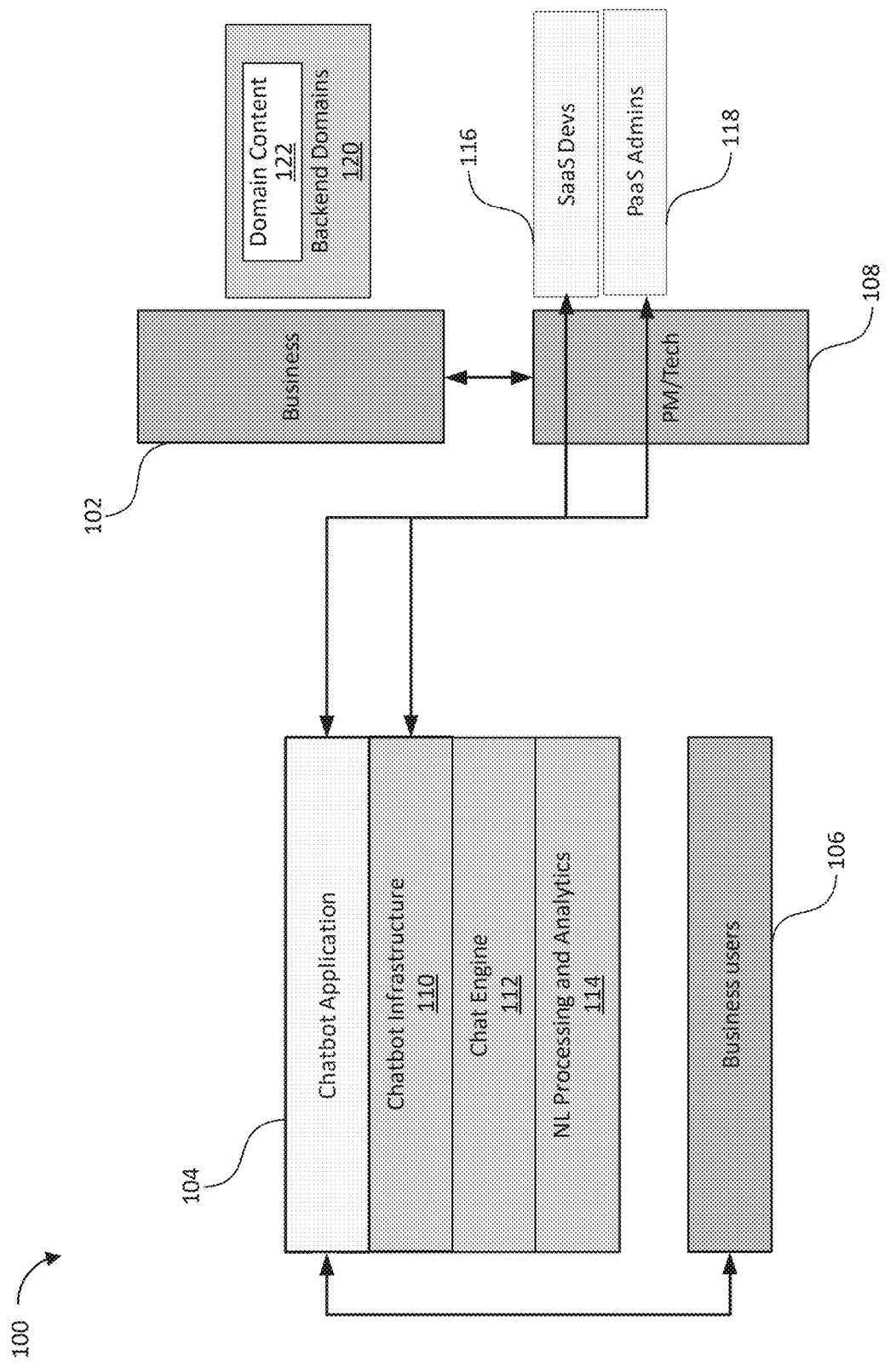
FIG. 1 illustrates an example operational environment for a conventional VA application system, according to an embodiment herein.

Some components or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

VA applications, fueled by advancements in NLP and AI, are increasingly vital for organizations, streamlining operations and enhancing productivity. However, their conventional designs face challenges, particularly due to their monolithic architecture. In this tightly coupled structure, IaaS, PaaS, and SaaS components are interdependent, hindering scalability, flexibility, and maintenance. For example, updates to one part within the monolithic architecture often necessitates modifications across the entire system, impeding agility and adaptability. Moreover, the tightly coupled nature limits the isolation and scalability of individual components, hindering horizontal scaling and independent feature deployment.

For example, one negative consequence of the monolithic architecture of conventional VA applications is the integration of backend domain content (e.g., business systems or records) directly into the VA application. This approach necessitates extensive preprocessing of backend domain data to fit within the confines of the monolith. As a result, the integration process becomes more complex and time-consuming, requiring significant effort to ensure compatibility and consistency between the virtual assistant and backend systems. Furthermore, this tight coupling between backend domain content and the monolithic architecture makes it challenging to separate and manage these components independently, hindering flexibility and scalability. Any changes or updates to the backend systems may require corresponding modifications to the entire monolith, further exacerbating maintenance challenges and impeding agility in development cycles. Thus, while integrating backend domains into VA applications can provide valuable functionality, the monolithic architecture introduces overhead and complexity that can limit the application's overall effectiveness and scalability.

Another issue faced by conventional VA applications is the tight coupling between backend systems and the monolithic architecture, leading to prolonged development cycles. The integration of domain content into the monolith creates dependencies between different components, including the Digital Assistant Provider (DAP) platform and the Business-to-Consumer (B2C) application. As a result, any changes or updates to the domain content require approval and validation processes that can be time-consuming. The coupling between the DAP platform, which produces content, and the B2C application, which consumes it, complicates the approval and validation processes, often resulting in delays. These extended development cycles not only impede the timely delivery of new features and updates but also increase the risk of inconsistencies and errors due to the prolonged integration timelines. Thus, while the monolithic architecture provides functionality, it also introduces challenges in maintaining agility and efficiency within the development lifecycle of VA applications.

Another challenge stemming from the monolithic architecture of conventional VA applications involves the accessibility of legacy domain content for processing within the DAP. Due to the tightly coupled nature of the monolith, legacy domain content may not be readily available or compatible with modern DAP processing methods. This presents a significant hurdle as integrating legacy content into the VA ecosystem requires extensive preprocessing and transformation efforts to align with the monolithic architecture's constraints. Additionally, the complex security schemes employed to map DAP and business requirements for content access further exacerbate the challenge. Ensuring secure access to domain content while maintaining compatibility with the monolithic architecture's security model can be convoluted and time-consuming. As a result, the monolithic architecture introduces barriers to efficiently leveraging legacy domain content within VA applications, hindering agility and innovation in content processing and access.

Yet another issue faced by current VA applications is the reliance on a single AI model trained on all backend domain content. In this approach, the same AI model is tasked with understanding and processing diverse types of information from various backend systems, such as customer records, financial data, and product information. While this approach may seem efficient, it can lead to inaccuracies and limitations due to the complexity and diversity of the content being processed. Since the AI model is trained on a broad spectrum of domain content, it may struggle to accurately interpret and respond to specific queries or requests, especially those that require nuanced understanding or context. Moreover, inaccuracies can arise when the AI model encounters content outside its training data, leading to errors, misunderstandings, or incomplete responses. Additionally, the lack of specialization in the AI model may result in suboptimal performance for certain domains or industries, further exacerbating the issue of inaccuracies. Overall, relying on a single AI model for all backend domain content can introduce limitations and inaccuracies, reducing the overall user experience when interacting with a respective VA.

Furthermore, training a single large model on a broad spectrum of domain content, such as the AI models used by conventional virtual assistants, uses excessive amounts of electricity. Training such a model typically demands substantial computational resources, including powerful CPUs, GPUs, or specialized accelerators like TPUs. The energy consumption for training large models can range from hundreds to thousands of kilowatt-hours (kWh) or megawatt-hours (MWh), depending on the specific setup and training configuration. Accordingly, training these models can have a notable environmental impact due to their energy consumption.

To address the above issues with conventional VA applications, in particular their monolithic architecture in which backend domains (e.g., systems) are tightly coupled to the monolith, example domain interface engine(s) are provided herein. As will be described in greater detail below, domain interface engines provide a decoupled architecture in which backend domains are minimally integrated, if at all, into the architecture of the VA application. This decoupling allows backend systems to update and manage the backend domains, such as by updating or managing respective knowledge bases or business workflows, without impacting the VA application.

To provide the decoupled architecture, an example domain interface engine includes numerous microbots. Each of the microbots within a given domain interface engine is a modularized set of components that includes a small generative AI model that is assigned to a respective backend domain. By assigning each microbot within the domain interface engine to a different backend domain, each microbot is trained and configured to handle queries directed to the assigned domain content. In other words, instead of having a VA application containing a large single AI model trained to cover all backend domains, the domain interface engine includes microbots, each of which is trained to cover a specific area of domain content.

The decoupled architecture provided by the domain interface engine addresses the above described challenges faced by the monolithic architecture of traditional VA applications. For example, the domain interface engine allows changes (e.g., updates, maintenance) to be performed on different backend domains without affecting the functionality of the VA. As noted above, historically if one backend domain undergoes changes, then the entire virtual assistant may be impacted, and in some cases, inoperable until the changes are finalized and approved. Here, however, because each microbot handles a respective backend domain, if one backend domain undergoes changes or taken offline, the other backend domains remain accessible and operable by the remaining microbots. That is, the domain interface engine allows changes to be made to backend domains gradually and smoothly without interrupting customer support or experience.

Another advantage of the domain interface engine, in particular the microbots, is that it avoids or prevents confusion when queries from users for different domains look similar. As noted above, when a single AI model is trained on a large dataset, especially a dataset that covers various backend domains, the model is prone to confusion when users ask queries that could be directed to more than one backend domain. Since each microbot of the domain interface engine is assigned and trained on a specified domain content, confusion is less likely to occur because the microbot is trained only on that content. As such, the microbot is not able to include irrelevant information in its response to a query.

Not only does assigning and training each microbot on specific domain content prevent confusion, but tailoring each microbot to the content of a respective backend domain improves the functionality of the microbot, and thus the overall accuracy of the virtual assistant's responses. As can be appreciated, the more tailored and focused a microbot's interactions are with user queries and its respective backend domain, the more accurate the microbot's responses will become. Since the domain content to which the microbot is assigned is a segmented portion of the overall content that the virtual assistant covers, the microbot is able to provide tailored and focused responses to queries.

Beyond improvised response accuracy, the microbots of the domain interface engine require less computing power than conventional VA applications. As noted above, training a single model on a large dataset, such as all the backend domains within a given backend system, has intense resource implications. Since the microbots are trained on a smaller dataset, less computing resources are needed to train each microbot. As can be appreciated, by utilizing fewer computing resources, the domain interface engine not only enhances the VA application performance but also reduces energy consumption, leading to cost savings and environmental sustainability.

Turning now to the Figures, FIG. 1 illustrates an example operational environment for a conventional VA application system 100 (hereinafter "system 100"), according to an embodiment herein. FIG. 1 is provided to illustrate the challenges caused by the monolithic architecture of conventional VA applications, such as system 100. As shown, the system 100 includes a business 102 (e.g., backend system) and a chatbot application 104 (e.g., virtual assistant) that interacts with business users 106 of the business 102. For example, the business 102 may supply the chatbot application 104 to aid the business users 106 with various issues, such as provide immediate support for technical issues or a communication channel to direct users 106 to desired content or products.

As shown, the chatbot application 104 may include various components, such as a chatbot infrastructure 110, a chat engine 112, and a natural language processing and analytics component 114. The chatbot infrastructure 110 serves as the backbone of the chatbot application 104, orchestrating the administration, development of conversation flow design, and integration of API microservices seamlessly. At its core, the chat infrastructure 110 facilitates the creation and management of conversational experiences by enabling the design and deployment of dynamic conversation flows and management of APIs for the chatbot application 104. Through administration tools, developers, such as SaaS developers 116 described below, can effortlessly configure the behavior of the chatbot, fine-tuning its responses and adapting to evolving user needs.

The chat engine 112 may serve as the central nervous system of the chatbot application 104, seamlessly integrating chat servers to facilitate real-time communication while leveraging sophisticated natural language understanding algorithms to comprehend user input and generate appropriate responses. The natural language processing and analytics component 114 of the chatbot application 104 may analyze user inputs with advanced algorithms to accurately interpret intents and sentiments, while concurrently gathering valuable data insights to refine user experiences and optimize performance over time.

In the illustrated system 100, the chatbot application 104 is deployed on a Distributed Application Platform (DAP). As such, the system 100 includes a Project Management and Technical group 108 (hereinafter "group 108") that aid in developing, deploying, and maintaining the chatbot application 104 on the DAP. In particular, the group 108 includes SaaS developers 116 and PaaS administrators 118. As those skilled in the art readily appreciate, the SaaS developers 116 and the PaaS administrators 118 play vital roles in maintaining the functionality and performance of the chatbot application 104, ensuring it remains updated and operational within the cloud computing ecosystem.

As part of the development and deployment of the chatbot application 104, the business 102 exports domain content 122 associated with various backend domains 120. For example, the business 102 may be a large organization containing numerous backend domains 120, such as human resources (HR), finance, retail, and technology. Each of these backend domains 120 may have its own domain content 122, such as one or more knowledge bases and workflows, and criteria that defines a successful chatbot-user interaction. As such, during the development and deployment of the chatbot application 104, the business 102 exports this domain content 122 to the group 108 for integration into chatbot application 104. In other words, the business 102 hands off its domain content 122 to the group 108 for integration into the chatbot application 104.

From the domain content 122, the SaaS developers 116 create the data training model and logic flow for the chatbot application 104 and the PaaS administrators 118 create the program logic, knowledge management training, and other facets of the chatbot application 104 that are configured to the business's 102 standards. In particular, the SaaS developers 116 and the PaaS administrators 118 create and manage the functions of chatbot application 104, in particular the chatbot infrastructure 110, as described above. From there, the business users 106 interact with the chatbot application 104 as a SaaS application.

As can be appreciated, because the business 102 exports its domain content to the group 108 for integration into the chatbot application 104, the business 102 has minimal control or access to the domain content as used by the SaaS developers 116 and the PaaS administrators 118. Moreover, because the domain content on which the chatbot application 104 is trained is exported from the business 102 to the group 108, any changes to the domain content (e.g., knowledge bases or workflow) require coordination between the SaaS developers 116 and the PaaS administrators 118. As described above, this can cause interruptions in the chatbot application 104 service to the business users 106, thereby negatively impacting the user experience.

Figure 2:
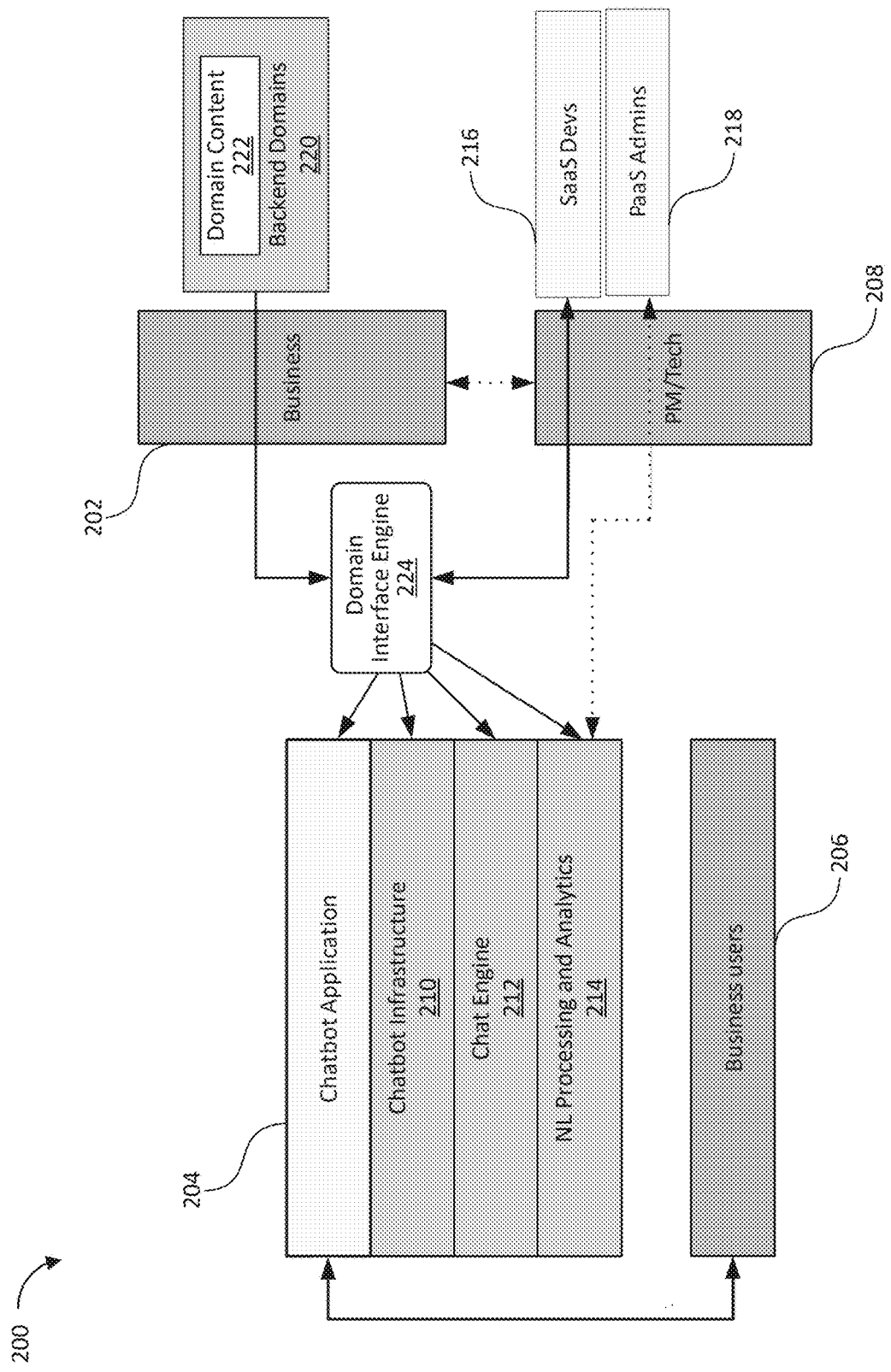
FIG. 2 illustrates an example operational environment for a chatbot application system including a domain interface engine, according to an embodiment herein.

Turning now to FIG. 2, an example operational environment for a chatbot application system 200 including a domain interface engine 224 is illustrated, according to an embodiment herein. As shown, the system 200 is similar to the system 100, such as including a business 202, a chatbot application 204, a group 208 including SaaS developers 216 and PaaS administrators 218, and business users 206. To develop and deploy the chatbot application 204, however, the system 200 includes the domain interface engine 224. As shown, the domain interface engine 224 provides an interface between the chatbot application 204 and the business 202 and the group 208.

As will be expanded on in greater detail below with respect to FIGS. 3-6, the domain interface engine 224 communicates directly with the backend domains 220 of the business 202. By communicating directly with the backend domains 220, the domain interface engine 224 allows the architecture of the chatbot application 204 to be decoupled. That is, to develop, deploy, and maintain the chatbot application 204, the domain interface engine 224 interacts with the backend domains 220 to gain responses regarding various domain content 222, instead of requiring the business 202 to export the entirety of its backend domains 220 to the group 208. As can be appreciated, by limiting or foregoing the requirement of the business 202 to export its backend domains 220, the business 202 can continuously update, change, or maintain its domain content 222 without needing to coordinate with the group 208 to incorporate those changes into the chatbot application infrastructure 210.

The domain interface engine 224 may be coded by SaaS developers 216, either as an external component running outside of the monolith or as a plug-in library at the monolith level. As those skilled in the art readily appreciate, the SaaS developers 216 code consumers for the APIs exposed at the chatbot infrastructure 210 for interacting with the chat engine 212 and the NL processing and analytics 214. The APIs exposed at the chat engine 212 may allow the domain interface engine 224 to send answers directly downstream to the chatbot application 204. The APIs exposed at the NL processing and analytics 214 may allow the domain interface engine 224 to get NL results and allow the domain interface engine 224 to interact with the analytics portion of the NL processing and analytics component 214.

Because the domain interface engine 224 provides the necessary information to the chatbot infrastructure 210, chat engine 212, and NL processing and analytics component 214, the PaaS administrators' 218 interaction with the chatbot application 204 is reduced to providing content for the NL processing and analytics component 214. For example, in the decoupled approach provided by the domain interface engine 224, the PaaS administrators 218 may provide maintenance and fine tuning for the NL processing when required. PaaS administrators 218 may also collect and aggregate PaaS built-in analytics via the domain interface engine 224 for use as key performance indicators. PaaS administrators 218 ensure that the APIs retrieved at chatbot infrastructure 210 for the chat engine 212 and the NL processing and analytics 214 are accessible and compliant with the PaaS compliance frameworks policies for the domain interface engine 224 on an ongoing basis.

Figure 3:
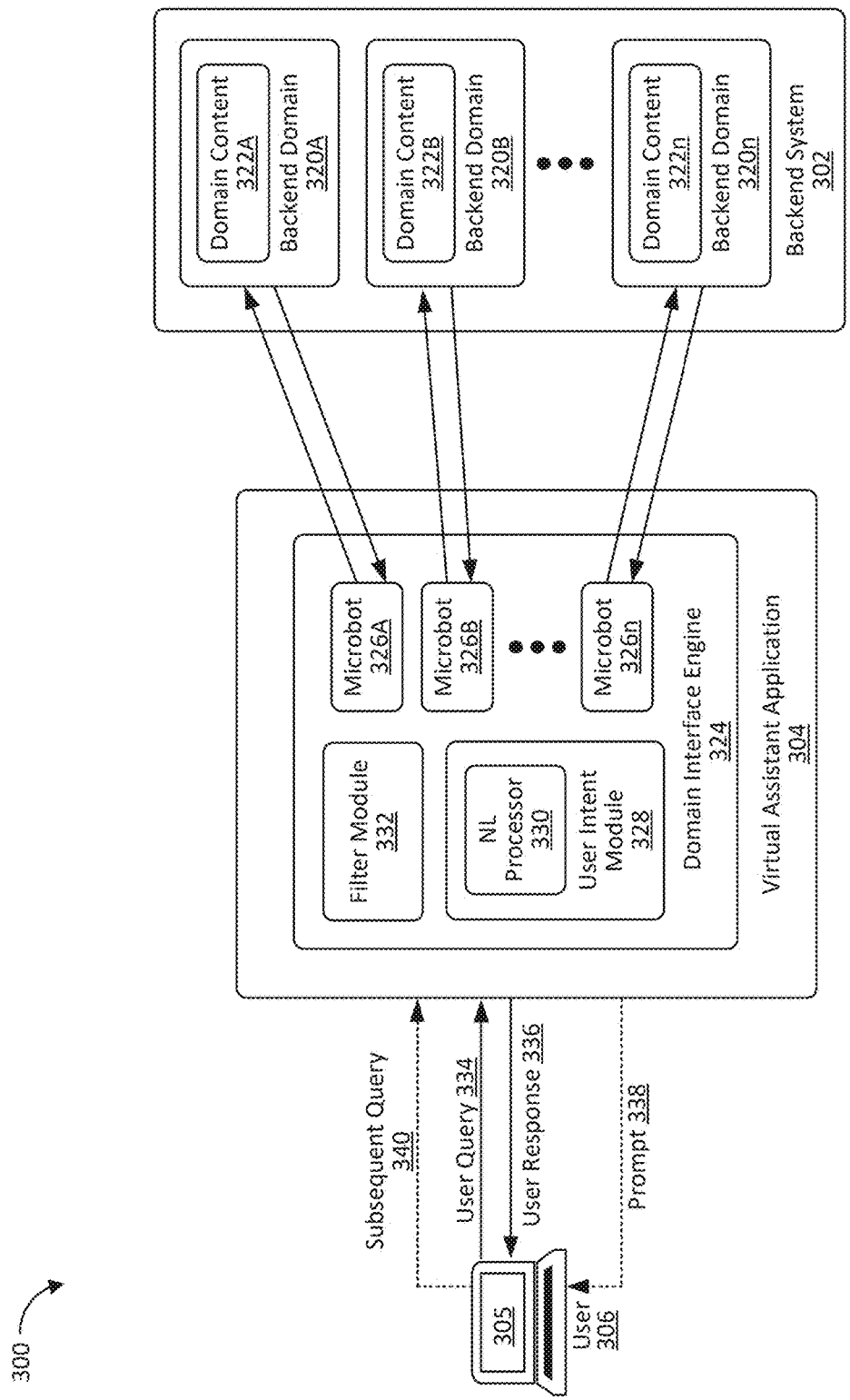
FIG. 3 illustrates an example system for providing a virtual assistant application containing a domain interface engine, according to an embodiment herein.

Referring now to FIG. 3, an example system 300 for a virtual assistant application containing a domain interface engine 324 is provided, according to an embodiment herein. As shown, a user 306, which may be the same or similar to the business users 106 or 206 described above, interacts with a virtual assistant application 304 ("VA application 304") via a client device 305. The VA application 304 may be the same or similar to the chatbot application 204.

Figure 7:
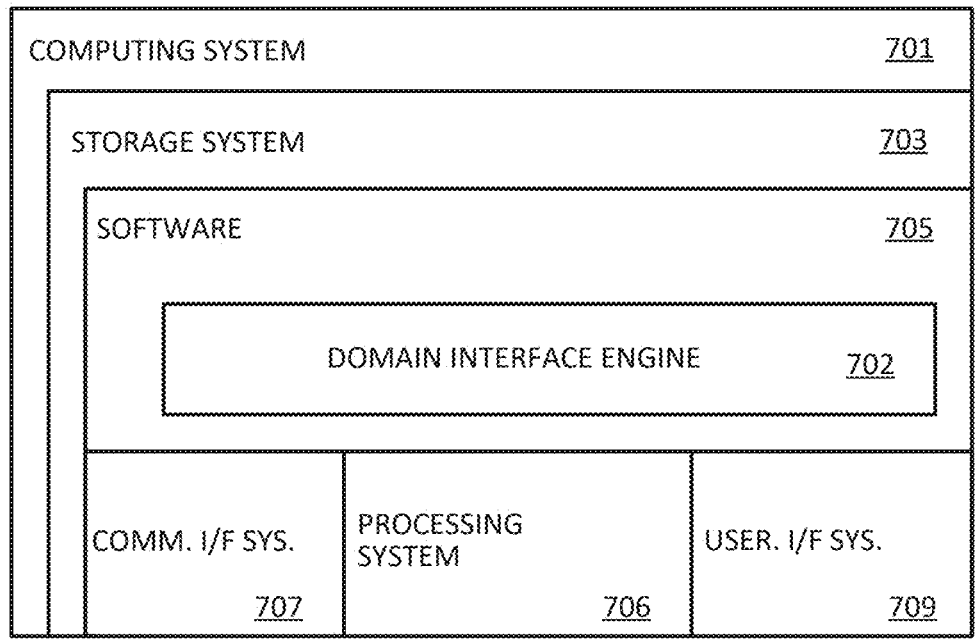
FIG. 7 shows an example computing device suitable for providing a domain interface engine and its related functions, according to an embodiment herein.

Broadly speaking, the client device 305 may access and interact with the VA application 304 in a cloud environment. For example, the client device 305 may communicate with the VA application 304 via one or more internets and intranets, the Internet, wired and wireless networks, local area networks (LANs), wide area networks (WANs), or any other type of network or combination thereof. Examples of the client device 305 may include personal computers, tablet computers, mobile phones, gaming consoles, wearable devices, Internet of Things (IoT) devices, and any other suitable devices, of which computing apparatus 701 in FIG. 7 is also broadly representative.

The VA application 304 may include the domain interface engine 324. The domain interface engine 324 may provide the VA application 304 with a decoupled architecture, as described herein. To decouple the VA application 304, the domain interface engine 324 includes microbots 326A-326n. It should be appreciated, that while only three microbots 326A-326n are illustrated, the domain interface engine 324 may include any number of microbots 326A-326n. Each of the microbots 326A-326n may be a modular set of components configured to perform various functions. As will be described in greater detail below with respect to FIG. 5, each microbot may include a natural language (NL) processor, a filter module, a generator, and/or a validation module.

Each microbot 326A-326n may be assigned to a respective backend domain 320A-320n associated with backend system 302. The backend system 302 may be a business, such as business 202. As noted above, the backend system 320 may include multiple backend domains 320A-320n, such as human resources, finance, operations, research, or marketing. As can be appreciated, the type and number of backend domains 320A-320n that the backend system 302 contains depends on the type of business or organization that the backend system 302 operates.

Each backend domain 320A-320n includes domain content 322A-322n. Domain content 322A-322n includes information associated with its respective backend domain 320A-320n that the VA application 304 uses to interact with the user 306, such as knowledge bases, workflows, and criteria for when a VA-user interaction is successful. It should be appreciated, that while each backend domain 320A-320n includes a single domain content 322A-322n, that a backend domain may include more than one domain content, such as multiple knowledge bases. Similarly, while the following illustration discusses each microbot 326A-326n being assigned to a respective backend domain 326A-326n, that in some cases, a microbot 326A-326n may be assigned to a respective domain content 322A-322n within a given backend domain. And in still another embodiment, a microbot 326A-326n may be assigned to a specific area or segment or portion of domain content 322A-322n.

Each of the microbots 326A-326n may be assigned to a respective backend domain 320A-320n (or domain content 322A-322n) during a set up of the VA application 304 or the domain interface engine 324. For example, during a configuration process of the domain interface engine 324, a hosting organization may identify and assign each backend domain 320A-320n (or domain content 322A-322n) to a respective microbot 326A-326n. As can be appreciated, each backend domain 320A-32n (or domain content 322A-322n) may be distributed or spread between each of the microbot 326A-326n such that each microbot covers a different backend domain 320A-320n (or domain content 322A-322n).

Figure 4:
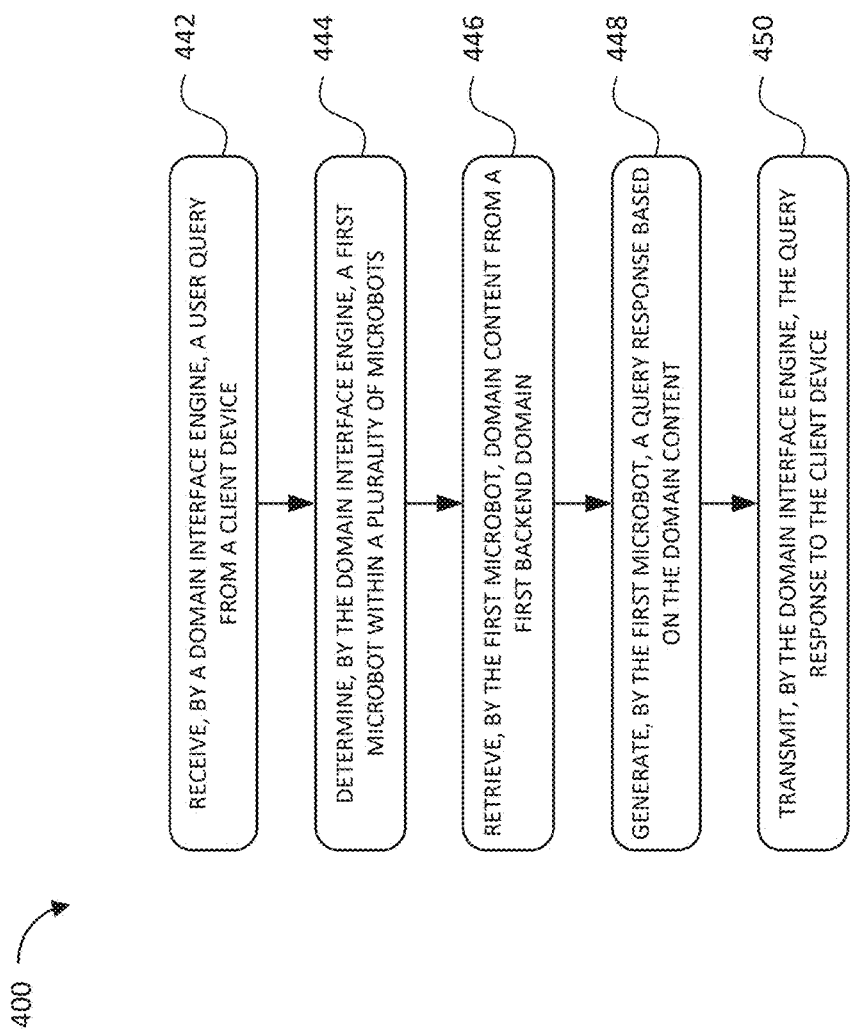
FIG. 4 illustrates an example domain interface engine process, according to an embodiment herein.
Figure 5:
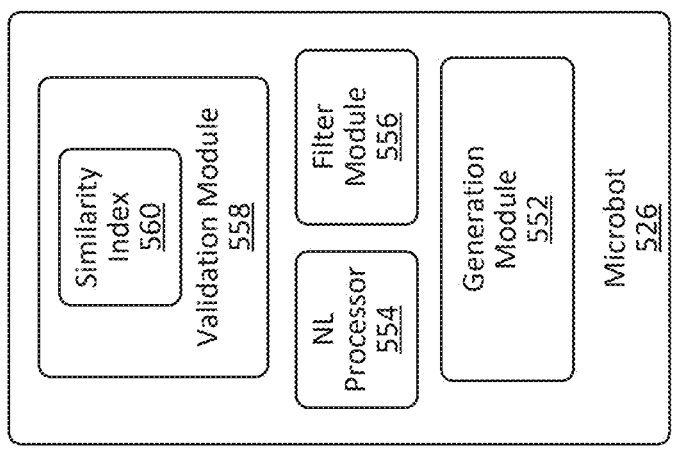
FIG. 5 illustrates an example microbot, according to an embodiment herein.

For ease of explanation, the remaining discussion of FIG. 3 is described in conjunction with FIGS. 4 and 5. As the following discussion expands, a corresponding Figure is referenced in turn. It should be appreciated that while a corresponding Figure is referenced during the discussion of FIG. 2, components, elements, and steps from any other Figures described herein may be equally applicable. Starting with FIG. 4, FIG. 4 provides an example domain interface engine process, in particular, a process 400 for providing the domain interface engine 324 and one or more of its functions, according to an embodiment herein.

With reference to FIG. 3, the user 306 via the client device 305 may submit a user query 334 to the VA application 304. For example, the user 306 may request technical support for a product that is supplied by the backend system 302. Since the VA application 304 has a decoupled architecture containing the domain interface engine 324, the domain interface engine 324 may receive the user query 334 from the client device 305 (442).

The domain interface engine 324 may be or include a message-based model that serves as an underlying framework for communication between the VA application 304 and the client device 305. For example, when the user 306 sends a message to the VA application 304, via the client device 305, the message is treated as a discrete unit of information. As such, when the user query 334 is received, the domain interface engine 324 may determine a user intent of the user query 334. For example, if the user query 334 includes a request for technical support, the domain interface engine 324 may determine that the user intent of the user query 334 is to gain assistance from the VA application 304.

In some cases, as part of the user intent, the domain interface engine 324 may also determine which backend domain 320A-320n is applicable or most likely to contain relevant information for resolving the user query 334. For example, if the user query 334 involves a request on the lead time or availability of a product, then the domain interface engine 324 may determine which backend domain 320A-320n contains or corresponds to the particular product or product inventory. However, if the user query 334 involves a request on the current job opportunities, then the domain interface engine 324 may determine that a different backend domain 320A-320n is associated or contains information relating to pursuing careers at the backend system 302.

To determine the user intent from the user query 334, the domain interface engine 324 may include a user intent module 328. The user intent module 328 may include a NL processor 330. As those skilled in the art may readily appreciate, the NL processor 330 may include a NL model and may parse the user query 334 by analyzing the syntactic and semantic structure of the query 334, identifying keywords, entities, and contextual cues to determine the user's intent. As will be described below with respect to FIG. 6, in some cases, the user intent module 328 may be separate from the domain interface engine 324.

Upon receipt of the user query 334, the domain interface engine 324 may determine a microbot from the microbots 326A-326n for handling the user query 334 (444). For example, the domain interface engine 324 may select the microbot 326A for handling the user query 334. The domain interface engine 324 may select the microbot 326A for handling the user query 334 based on the microbot 326A being assigned to the backend domain 320A or the microbot 326A being assigned to the domain content 322A. In other words, the domain interface engine 324 may determine that the microbot 326A is assigned to or otherwise corresponds to the domain content 322A. Since the user query 334 involves the domain content 322A, the domain interface engine 324 may select the microbot 326A for handling the user query 334. In some cases, the domain interface engine 324 may select the microbot 326A for handling the user query 334 based on the user intent determined by the user intent module 328. Once selected, the domain interface engine 324 may transmit or otherwise indicate to the microbot 326 that it is to handle the user query 334.

When the microbot 326 receives the user query 334, the microbot 326 may retrieve the domain content 322A from the backend domain 320A (446). In particular, the microbot 326 may receive a domain response from the backend domain 320A that includes domain content 322A relevant to the user query 334. To retrieve the domain content 322A from the backend domain 322A, the microbot 326A may include various components.

Referring now to FIG. 5, an example microbot 526 is illustrated, according to an embodiment herein. The microbot 526 may be the same or similar to the microbots 326A-326n. For ease of discussion, the microbot 526 is used interchangeably with the microbot 326A. As shown, the microbot 526 may include various components, including a generation module 552, a NL processor 554, a filter module 556, and a validation module 558. As can be appreciated, the microbot 526 may include all or only a subset of these components, as well as additional components.

To retrieve relevant domain content 322A, the microbot 526 may generate a domain request based on the user query 334. In some cases, the domain request may include the user intent and user data associated with the user 306, as will be described in greater detail below with respect to FIG. 6. In particular, the generation module 552 of the microbot 326 may generate the domain request based on the user query 334. In an example, the generation module 552 may include a content generator, such as a generative AI or machine learning (NL) model, for generating the domain request based on the user query 334.

As described above, since the microbot 526 is assigned to a respective backend domain, here, 320A, containing the domain content 322A, the generation module 552 may be trained on the domain content 322A. As such, the microbot 526 is tailored to the characteristics and nuances present in the domain content 322A, as well as the user queries 344 directed to the domain content 322A. As such, the microbot

526 achieves domain specificity and is able to accurately navigate or direct the user query 334 to an appropriate domain content 322A, thereby providing an accurate user response 336.

In addition to improved response accuracy, the training time for the microbot 526 is significantly reduced over conventional VA application approaches due to the limited dataset size of the domain content 322A on which the microbot 526 is trained. As such, the microbot 526 provides a more resource-efficient approach to hosting a VA application.

In some cases, prior to generating a domain request based on the user query 334, the microbot 526 may filter the user query 334 to remove restricted content. Restricted content may include content that is irrelevant to answering the user query 334. For example, restricted content may include abusive or obscene language, personally identifiable information (PII), or content that the VA application 304 is not permitted to respond to. Content that the VA application 304 is prohibited from responding to may include competitive market questions (e.g., why is competitor X a better product) or information that is internal to the organization (e.g., financial data or internal policies or procedures).

To identify the restricted content from the user query 334, the microbot 526 may include the NL processor 554. In other words, the user query 334, upon receipt by the microbot 526, may be processed by the NL processor 554 to identify restricted content. If the microbot 526 identifies restricted content in the user query 334, the microbot 526 may generate and send a redirecting response to the client device 305, depending on the restricted content. For example, if the microbot 526 determines that the user query 334 is directed to requesting financial data about the organization, then the microbot 526 may send the redirecting response to the user 306 informing the user 306 that the VA application 304 cannot answer the user query 334. If, however, the restricted content only contains PII, then the microbot 526, in particular the filter module 556, may filter out the restricted content from the user query 334 and generate the domain request from the filtered user query 334.

In some cases, the filter module 556 may also determine whether the user query 334 is directed to an inapplicable domain and return a redirecting response if it is. An inapplicable domain may be a backend domain that is not included in the backend domains 320A-320n. For example, if the VA application 304 is a customer support chatbot that is meant to aid users, such as the user 306, with technical support on various products, but the user query 334 involves a question on how to apply to a job posting, then the filter module 556 may determine that the user query 334 is directed to an inapplicable domain. In some cases, an inapplicable domain may be a backend domain that is related to the backend system 302 but is not included in the backend domains 320A-320n associated with the VA application 304. When the microbot 526 determines that the user query 334 is directed to an inapplicable domain, microbot 526 may generate, via the generation module 552, a redirecting response that includes information, such as a link, associated with the inapplicable domain. Following the above example, the microbot 526 may generate a redirecting response that includes a link to a job posting or a VA application that handles job applications for the organization.

As described above, the microbot 526 retrieves the domain content 322A that is associated with the user query 334 from the backend domain 320A. Upon receipt of the domain content 322A from the backend domain 320A, the microbot 526 generates a user response 336 based on the domain content 322A (448). The domain interface engine 324, via the VA application 304, then transmits the user response 336 to the client device 305 (450).

In some cases, prior to generating the user response 336, the microbot 526 may validate the domain content 322A received from the backend domain 320A. As will be described in greater detail below, the backend domain 320A may receive the domain request from the microbot 526 and identify appropriate domain content 322A to respond to the user query 334. For example, the backend domain 320A may include a large language model (LLM) or other AI or ML model that generates a domain response to the domain request. As such, the domain response may include domain content 322A for responding to the user query 334. To ensure that the domain response, in particular the domain content 322A, provides an adequate or accurate response to the user query 334, the microbot 526 may validate the domain response.

To validate the domain response, the microbot 526 may include a validation module 558. The validation module 558 may include a similarity index 560. The validation module 558, via the similarity index 560, may measure the likeness or similarity between the user query 334 and the domain response provided from the backend domain 320A. For example, the similarity index 560 may systematically evaluate the correspondence between the user query 334, the domain response, and predefined intents or responses associated with the VA application 304.

In an illustrative example, the similarity index 560 may dissect the text of the user query 334 into its constituent elements, such as words and phrases, before proceeding to compare these components against the domain response. Employing algorithms like cosine similarity or Jaccard similarity, the similarity index 560 computes a numerical score, degree of similarity, or distance measure to gauge the proximity between the user input and the domain response. Through this comparative analysis, a similarity measure is computed for the domain response based on the user query 334, considering factors like keyword relevance, context, and semantic meaning. The validation module 558 then may compare the similarity measure against a similarity threshold and if the similarity measure of the domain response is determined to be below the similarity threshold (e.g., not similar), the validation module 558 may determine that the domain response is irrelevant or in accurate. In such a case, the microbot 526 may generate a subsequent domain request via the generation module 552 and re-query the backend domain 520A, or the microbot 526 may generate and send a redirecting response as the user response 336 indicating its inability to answer the user query 33.

On the other hand, if the validation module 558 determines that the similarity measure for the domain response is above the similarity threshold, then the microbot 526 may determine that the domain response is similar or appropriate for the user query 334. As such, the microbot 526 may generate the user response 336 based on the domain response (448) and transmit the user response 336 to the client device 305 (450).

In some embodiments, the domain interface engine 324 may require more information than is provided in the user query 334 to determine which microbot 326A-326n to assign to the user query 334. In such a case, the domain interface engine 324 may generate and send a prompt 338 to the client device 305. The prompt 338 may include a content that is meant to elicit a response from the user 306. For example, the user query 334 may include a request for technical support. The user query 334 may not include information on what the user 306 needs the technical support with. As such, the prompt 338 may include a request for what product or service the user 306 needs technical support with. Responsive to receiving the prompt 338, the user 306 may submit a subsequent query 340. When the domain interface engine 324 receives the subsequent query 340, the domain interface engine 324 may determine which microbot 326A-326n to handle the user query 334 (and the subsequent query 340). In an example, the domain interface engine 324 may determine a user intent, via the user intent module 328, based on the subsequent query 340 or in some cases, based on a combination of the subsequent query 340 and the user query 334.

As shown, the domain interface engine 324 may include a filter module 332. In some cases, one or more filtering steps as described above with respect to the filter module 556 may be performed by the filter module 332. For example, in some cases, prior to determining a user intent or determining which microbot 326A-326n to handle the user query 334, the domain interface engine 324 may filter the user query 334 to remove restricted content, or certain types of restricted content, such as abusive language or PII.

To provide one or more of the domain interface functions described above, the domain interface engine 324 may employ one or more server computers (not shown) co-located with respect to each other or distributed across one or more data centers, of which computing apparatus 701 in FIG. 7 is broadly representative. In some embodiments, the domain interface engine 324, along with its various components, may be hosted on the same servers or infrastructure as the VA application 304, while in other embodiments, the domain interface engine 324 may be hosted separately, such as by a third party. Various configurations are contemplated herein.

Figure 6:
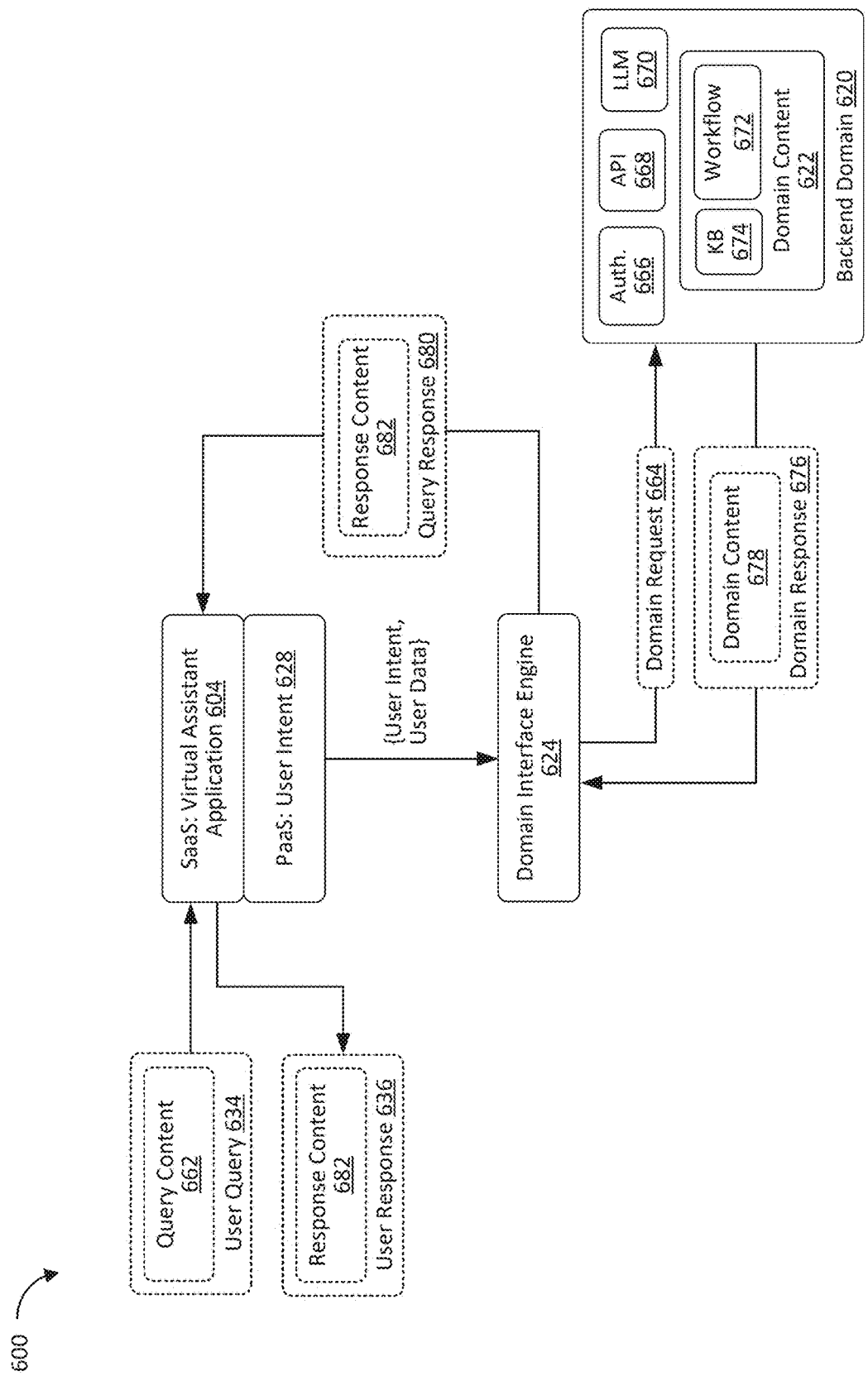
FIG. 6 illustrates an example flow for a user-VA interact, according to an embodiment herein.

Referring now to FIG. 6, an example flow 600 for a user-VA interaction is illustrated, according to an embodiment herein. As illustrated, a virtual assistant application 604 ("VA application 604"), which may be the same or similar to the VA application 304, receives a user query 634. The user query 634 may be received from a user via a client device, such as the user 306 via the client device 305. The user query 634 may include query content 662, such as message or text containing a question for the VA application 604. The query content 662 may also include user data. In some cases, as part of the message exchange process, the VA application 604 may request information from the user or may link the user with an associated user profile. In other cases, the user may include information, such a username, phone number, email address, or other PII.

Upon receipt of the user query 634, the VA application 604 may determine a user intent 628 from the user query 634, as described above. In the illustrated example, the user intent 628 may be determined as part of the PaaS component of the VA application 604. For example, a PaaS component may integrate AI services into the VA application 604, such as incorporating a ML API or NLP library into the VA application 604. As such, the user query 634 may be parsed by the AI service integrated by the PaaS component to determine the user intent 628.

Once the user intent 628 is determined the VA application 604 may provide the user intent 628 to a domain interface engine 624. In some cases, the VA application 604 may also provide the user data and/or the user query 634 to the domain interface engine 624. As can be appreciated, in some cases, the user intent 628 may contain the relevant information from the user query 634, and as such, the VA application 604 may not provide the user query 634 to the domain interface engine 624. However, in cases where the domain interface engine 624 determines the user intent 628, such as described above, then the user query 634 may be provided to the domain interface engine 624.

From the user intent 628, and in some cases the user data, the domain interface engine 624 may generate a domain request 664. The domain request 664 may include a prompt or request for a respective backend domain 620. As described above, the domain interface engine 624 includes multiple microbots, each of which is assigned to a respective backend domain. As such, a respective microbot may generate a domain request 664 to a respective backend domain, represented here as the backend domain 620.

The backend domain 620 may include a variety of components, such as an authorization module 666, an API 668, a large language model (LLM) 670, and domain content 622. As described above, the domain content 622 may contain one or more knowledge bases 674 and one or more workflows 672 associated with the backend domain 620. When the domain request 664 is received, the authorization module 666 may authenticate the domain request 664 as a valid request and the API 668 may provide the domain interface engine 624 with access to the various components of the backend domain 620. For example, the API 668 may coordinate or direct the domain request 664 to the LLM 670. While the LLM 670 is illustrated in the flow 600, it should be appreciated that the backend domain 620 may include any variety of language processing systems, such as NLP, ML systems, or generative AI models.

The LLM 670 may receive the domain request 664 and generate a domain response 676 to the domain request 664. For example, the LLM 670 may receive the domain request 664 as a prompt and query the domain content 622 to retrieve relevant information form the knowledge base 675 and/or workflows 672 to provide the domain response 676. As such, the domain response 676 may include domain content 678 corresponding to the fetched domain content 622 from the backend domain 620. As can be appreciated, the domain response 676 may include a natural language response to the domain request 664, as well as the specific information pulled from the domain content 622 (e.g., the domain content 678).

When the domain interface engine 624 receives the domain response 676, the domain interface engine 624 may validate the domain response 676, as described above. After the domain response 676 is validated, the domain interface engine 624, in particular a respective microbot, generates a query response 680. The query response 680 may include response content 682, such as a message tailed to the user and the domain content 678 provided from the backend domain 620. As can be appreciated, the domain interface engine 624 may have more context on the interaction between the user and the VA application 604 and as such may modify the domain response 676 received from the backend domain 620 such to fit into the context of the interaction.

Once the VA application 604 receives the query response 680, the VA application 604 transmits the query response 680 to the user as a user response 636. The user response 636 may be provided to the user via an interface such to indicate that the user response 636 is responsive to the submitted user query 634.

Referring now to FIG. 7, is a diagram of a system 700 configured to implement a domain interface engine, according to an embodiment herein. The system 700 may be an example of an apparatus including a computing apparatus 701 that is representative of any system or collection of systems in which the various processes, systems, programs, services, and scenarios disclosed herein may be implemented. For example, computing apparatus 701 may be an example domain interface engine, such as the domain interface engine 324, a client device, such as the client device 305, or any of the subcomponents depicted in system 300 of FIG. 3. Examples of computing apparatus 701 include, but are not limited to, server computers, desktop computers, laptop computers, routers, switches, web servers, cloud computing platforms, and data center equipment, as well as any other type of physical or virtual server machine, physical or virtual router, container, and any variation or combination thereof.

Computing apparatus 701 may be implemented as a single apparatus, system, or device or may be implemented in a distributed manner as multiple apparatuses, systems, or devices. Computing apparatus 701 may include, but is not limited to, processing system 706, storage system 703, software 705, communication interface system 707, and user interface system 709. Processing system 706 may be operatively coupled with storage system 703, communication interface system 707, and user interface system 709.

Processing system 706 may load and execute software 705 from storage system 703. Software 705 may include a domain interface engine 702, which may be representative of any of the operations for providing a domain interface engine or any of its related functions, as discussed with respect to the preceding figures. When executed by processing system 706, software 705 may direct processing system 706 to operate as described herein for at least the various processes, such as the process 400, operational scenarios, and sequences discussed in the foregoing implementations. Computing apparatus 701 may optionally include additional devices, features, or functionality not discussed for purposes of brevity.

In some embodiments, processing system 706 may comprise a micro-processor and other circuitry that retrieves and executes software 705 from storage system 703. Processing system 706 may be implemented within a single processing device but may also be distributed across multiple processing devices or sub-systems that cooperate in executing program instructions. Examples of processing system 706 may include general purpose central processing units, graphical processing units, application specific processors, and logic devices, as well as any other type of processing device, combinations, or variations thereof.

Storage system 703 may comprise any memory device or computer-readable storage medium readable by processing system 706 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer-readable storage medium a propagated signal.

In addition to computer-readable storage medium, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 706 or possibly other systems.

Software 705 (including the domain interface engine 702 among other functions) may be implemented in program instructions that may, when executed by processing system 706, direct processing system 706 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtualization software, or other application software. Software 705 may also comprise firmware or some other form of machine-readable processing instructions executable by processing system 706.

In general, software 705 may, when loaded into processing system 706 and executed, transform a suitable apparatus, system, or device (of which computing apparatus 701 is representative) overall from a general-purpose computing system into a special-purpose computing system as described herein. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer-readable storage medium are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between the computing apparatus 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

The foregoing examples and descriptions are described herein in the context of systems and methods for providing a domain interface engine or one or more of its related functions. Those of ordinary skill in the art will realize that these descriptions are illustrative only and are not intended to be in any way limiting. Reference is made in detail to implementations of examples as illustrated in the accompanying drawings. The same reference indicators are used throughout the drawings and the description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. That is, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in an embodiment," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for" but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a computing apparatus comprising: a computer-readable storage medium; a domain interface engine comprising processor-executable instructions stored on the computer-readable storage medium; and one or more processors coupled to the computer-readable storage medium and configured to execute the processor-executable instructions, wherein the processor-executable instructions, when executed by the one or more processors, direct the computing apparatus, to at least: receive, from a first client device, a user query, wherein the domain interface engine comprises a plurality of microbots and each microbot of the plurality of microbots is assigned to a respective backend domain within a plurality of backend domains; determine a first microbot from a plurality of microbots for handling the user query, wherein: each microbot of the plurality of microbots is assigned to a respective backend domain within a plurality of backend domains; and the first microbot is assigned to a first backend domain; retrieve domain content from the first backend domain corresponding to the user query; generate a query response based on the domain content; and transmit, to the first client device, the query response.

Example 2 is the computing apparatus of any previous or subsequent Example, wherein the processor-executable instructions to determine the first microbot from the plurality of microbots for handling the user query, when executed by the one or more processors, further direct the computing apparatus to: determine domain content based on the user query; determine that the first backend domain comprises the domain content; and select the first microbot for handling the user query based on the first backend domain comprising the domain content.

Example 3 is the computing apparatus of any previous or subsequent Example, wherein the domain interface engine comprises a natural language model and the processor-executable instructions to determine the first microbot of the plurality of microbots for handling the user query, when executed by the one or more processors, further direct the computing apparatus to: submit the user query to the natural language model; determine a user intent of the user query based on a response from the natural language model; and select the first microbot from a plurality of microbots for handling the user query based on the user intent.

Example 4 is the computing apparatus of any previous or subsequent Example, wherein the processor-executable instructions, when executed by the one or more processors, further direct the computing apparatus to: receive a second user query from a second client device; determine that the second user query corresponds to an inapplicable domain; and transmit a redirecting response based on the second user query to the second client device.

Example 5 is the computing apparatus of any previous or subsequent Example, wherein: the processor-executable instructions to retrieve the domain content from the first backend domain corresponding to the user query, when executed by the one or more processors, further direct the computing apparatus to: receive, from the first backend domain, a domain response from the first backend domain, wherein domain response comprises the domain content; and determine, by the first microbot, that the domain response comprises restricted content; and the processor-executable instructions to generate the query response based on the domain content, when executed by the one or more processors, further direct the computing apparatus to: generate a redirecting response based on the restricted content, wherein the query response comprises the redirecting response.

Example 6 is the computing apparatus of any previous or subsequent Example, wherein the processor-executable instructions, when executed by the one or more processors, further direct the computing apparatus to: filter, by the first microbot, the user query to remove restricted content from the user query to retrieving the domain content from the first backend domain.

Example 7 is the computing apparatus of any previous or subsequent Example, wherein the processor-executable instructions, when executed by the one or more processors, further direct the computing apparatus to: validate, by the first microbot, the domain content from the first backend domain based on a similarity index prior to generating the query response, wherein validating the domain content based on the similarity index determines a degree of similarity between the domain content and the user query.

Example 8 is a method comprising: receiving, by a domain interface engine, a user query from a first client device, wherein the domain interface engine comprises a plurality of microbots and each microbot of the plurality of microbots is assigned to a respective backend domain within a plurality of backend domains; determining, by the domain interface engine, a first microbot of the plurality of microbots for handling the user query, wherein the plurality of microbots comprises the first microbot and the first microbot is assigned to a first backend domain; retrieving, by the first microbot, a domain content from the first backend domain corresponding to the user query; generating, by the first microbot, a query response based on the domain content; and transmitting, by the domain interface engine, the query response to the first client device.

Example 9 is the method of any previous or subsequent Example, wherein the domain interface engine comprises a natural language model and determining, by the domain interface engine, the first microbot of the plurality of microbots for handling the user query further comprises: determining, by the domain interface engine, that additional information is needed based on the user query; transmitting, by the domain interface engine, a prompt to the first client device, wherein the prompt is configured to elicit a subsequent query from the first client device; submitting, by the domain interface engine, the subsequent query to the natural language model; and responsive to receiving a response from the natural language model, selecting, by the domain interface engine, the first microbot of the plurality of microbots for handling the user query based on the subsequent query.

Example 10 is the method of any previous or subsequent Example, wherein determining, by the domain interface engine, the first microbot of the plurality of microbots for handling the user query further comprises: determining, by the domain interface engine, that the user query corresponds to domain content of the first backend domain; determining, by the domain interface engine, that the first microbot is associated with the first backend domain; and assigning, by the domain interface engine, the user query to the first microbot based on the first backend domain comprising the domain content.

Example 11 is the method of any previous or subsequent Example, the method further comprises assigning each microbot of the plurality of microbots to a respective backend domain of the plurality of backend domains during a configuration process of the domain interface engine.

Example 12 is the method of any previous or subsequent Example, the method further comprising: receiving, by the domain interface engine, a second user query from a second client device; determining, by the domain interface engine, that the second user query corresponds to an inapplicable domain based on the second user query; and transmitting, by the domain interface engine, a redirecting response to the second client device responsive to determining that the second user query corresponds to the inapplicable domain.

Example 13 is the method of any previous or subsequent Example, wherein retrieving, by the first microbot, the domain content from the first backend domain corresponding to the user query further comprises: generating, by the first microbot, a prompt based on the user query and user data associated with the first client device, wherein the prompt is configured to elicit a response from the first backend domain; transmitting, by the first microbot, the prompt to the first backend domain; and receiving, by the first microbot, a domain response from the first backend domain, wherein the domain response comprises the domain content.

Example 14 is the method of any previous or subsequent Example, wherein determining, by the domain interface engine, the first microbot of the plurality of microbots for handling the user query further comprises: determining, by the domain interface engine, a user intent based on the user query; and selecting, by the domain interface engine, the first microbot of the plurality of microbots for handling the user query based on the user intent.

Example 15 is a computer-readable storage medium comprising processor-executable instructions, wherein the processor-executable instructions comprise a domain interface engine configured to cause one or more processors to: receive, from a first client device, a user query, wherein the domain interface engine comprises a plurality of microbots and each microbot of the plurality of microbots is assigned to a respective backend domain within a plurality of backend domains; determine a first microbot from a plurality of microbots for handling the user query, wherein: each microbot of the plurality of microbots is assigned to a respective backend domain within a plurality of backend domains; and the first microbot is assigned to a first backend domain; retrieve domain content from the first backend domain corresponding to the user query; generate a query response based on the domain content; and transmit, to the first client device, the query response.

Example 16 is the computer-readable storage medium of any previous or subsequent Example, wherein the processor-executable instructions of the domain interface engine to determine the first microbot from the plurality of microbots for handling the user query cause the one or more processors to further execute processor-executable instructions stored in the computer-readable storage medium to: determine that the user query corresponds to domain content; determine that the first backend domain comprises the domain content; and assign the user query to the first microbot based on the domain content being in the first backend domain.

Example 17 is the computer-readable storage medium of any previous or subsequent Example, wherein the processor-executable instructions of the domain interface engine to determine the first microbot from the plurality of microbots to handle the user query cause the one or more processors to further execute processor-executable instructions stored in the computer-readable storage medium to: determine a user intent based on the user query; and select the first microbot from the plurality of microbots based on the user intent.

Example 18 is the computer-readable storage medium of any previous or subsequent Example, wherein: the processor-executable instructions of the domain interface engine to retrieve the domain content from the first backend domain corresponding to the user query cause the one or more processors to further execute processor-executable instructions stored in the computer-readable storage medium to: receive, from the first backend domain, a domain response from the first backend domain, wherein the domain response comprises the domain content; and the processor-executable instructions cause the one or more processors to further execute processor-executable instructions stored in the computer-readable storage medium to: validate, by the first microbot, the domain response from the first backend domain, wherein validating the domain response comprises determining a degree of similarity between the domain content and the user query based on a similarity index.

Example 19 is the computer-readable storage medium of any previous or subsequent Example, the processor-executable instructions cause the one or more processors to further execute processor-executable instructions stored in the computer-readable storage medium to: filter, by the first microbot, the user query to remove restricted content from the user query prior to retrieving the domain content from the first backend domain.

Example 20 is the computer-readable storage medium of any previous or subsequent Example, wherein: the processor-executable instructions of the domain interface engine cause the one or more processors to further execute processor-executable instructions stored in the computer-readable storage medium to: determine a user intent based on the user query; and the processor-executable instructions of the domain interface engine to determine the user intent based on the user query cause the one or more processors to further execute processor-executable instructions stored in the computer-readable storage medium to: transmit a prompt to the first client device, wherein the prompt is configured to elicit a subsequent query from the first client device; and determine the user intent based on the subsequent query.

What is claimed is:

1. A computing apparatus comprising:
a computer-readable storage medium;
a domain interface engine comprising processor-executable instructions stored on the computer-readable storage medium; and
one or more processors coupled to the computer-readable storage medium and configured to execute the processor-executable instructions, wherein the processor-executable instructions, when executed by the one or more processors, direct the computing apparatus, to at least:
 receive, via a virtual assistant application, a user query from a first client device, wherein the domain interface engine:
  is integrated with the virtual assistant application; and
  comprises a plurality of microbots and each microbot of the plurality of microbots is assigned to a respective backend domain within a plurality of backend domains, wherein the plurality of backend domains are decoupled from the virtual assistant application;
 determine, by the domain interface engine, a first microbot from a plurality of microbots for handling the user query, wherein:
  each microbot of the plurality of microbots is assigned to a respective backend domain within a plurality of backend domains; and
  the first microbot is assigned to a first backend domain;
 retrieve domain content from the first backend domain corresponding to the user query;
 generate a query response based on the domain content; and
 transmit, to the first client device, the query response.

2. The computing apparatus of claim 1, wherein the processor-executable instructions to determine the first microbot from the plurality of microbots for handling the user query, when executed by the one or more processors, further direct the computing apparatus to:
determine domain content based on the user query;
determine that the first backend domain comprises the domain content; and
select the first microbot for handling the user query based on the first backend domain comprising the domain content.

3. The computing apparatus of claim 1, wherein the domain interface engine comprises a natural language model and the processor-executable instructions to determine the first microbot of the plurality of microbots for handling the user query, when executed by the one or more processors, further direct the computing apparatus to:
submit the user query to the natural language model;
determine a user intent of the user query based on a response from the natural language model; and
select the first microbot from a plurality of microbots for handling the user query based on the user intent.

4. The computing apparatus of claim 1, wherein the processor-executable instructions, when executed by the one or more processors, further direct the computing apparatus to:
receive a second user query from a second client device;
determine that the second user query corresponds to an inapplicable domain; and
transmit a redirecting response based on the second user query to the second client device.

5. The computing apparatus of claim 1, wherein:
the processor-executable instructions to retrieve the domain content from the first backend domain corresponding to the user query, when executed by the one or more processors, further direct the computing apparatus to:
receive, from the first backend domain, a domain response from the first backend domain, wherein domain response comprises the domain content; and
determine, by the first microbot, that the domain response comprises restricted content; and
the processor-executable instructions to generate the query response based on the domain content, when executed by the one or more processors, further direct the computing apparatus to:
generate a redirecting response based on the restricted content, wherein the query response comprises the redirecting response.

6. The computing apparatus of claim 1, wherein the processor-executable instructions, when executed by the one or more processors, further direct the computing apparatus to:
filter, by the first microbot, the user query to remove restricted content from the user query to retrieving the domain content from the first backend domain.

7. The computing apparatus of claim 1, wherein the processor-executable instructions, when executed by the one or more processors, further direct the computing apparatus to:
validate, by the first microbot, the domain content from the first backend domain based on a similarity index prior to generating the query response, wherein validating the domain content based on the similarity index determines a degree of similarity between the domain content and the user query.

8. A method comprising:
receiving, by a domain interface engine integrated within a virtual assistant application, a user query from a first client device, wherein:
the domain interface engine comprises a plurality of microbots and each microbot of the plurality of microbots is assigned to a respective backend domain within a plurality of backend domains; and
the plurality of backend domains are decoupled from the virtual assistant application;
determining, by the domain interface engine, a first microbot of the plurality of microbots for handling the user query, wherein the plurality of microbots comprises the first microbot and the first microbot is assigned to a first backend domain;
retrieving, by the first microbot, a domain content from the first backend domain corresponding to the user query;
generating, by the first microbot, a query response based on the domain content; and
transmitting, by the domain interface engine, the query response to the first client device.

9. The method of claim 8, wherein the domain interface engine comprises a natural language model and determining, by the domain interface engine, the first microbot of the plurality of microbots for handling the user query further comprises:
determining, by the domain interface engine, that additional information is needed based on the user query;
transmitting, by the domain interface engine, a prompt to the first client device, wherein the prompt is configured to elicit a subsequent query from the first client device;
submitting, by the domain interface engine, the subsequent query to the natural language model; and
responsive to receiving a response from the natural language model, selecting, by the domain interface engine, the first microbot of the plurality of microbots for handling the user query based on the subsequent query.

10. The method of claim 8, wherein determining, by the domain interface engine, the first microbot of the plurality of microbots for handling the user query further comprises:
determining, by the domain interface engine, that the user query corresponds to domain content of the first backend domain;
determining, by the domain interface engine, that the first microbot is associated with the first backend domain; and
assigning, by the domain interface engine, the user query to the first microbot based on the first backend domain comprising the domain content.

11. The method of claim 8, the method further comprises assigning each microbot of the plurality of microbots to a respective backend domain of the plurality of backend domains during a configuration process of the domain interface engine.

12. The method of claim 8, the method further comprising:
receiving, by the domain interface engine, a second user query from a second client device;
determining, by the domain interface engine, that the second user query corresponds to an inapplicable domain based on the second user query; and
transmitting, by the domain interface engine, a redirecting response to the second client device responsive to determining that the second user query corresponds to the inapplicable domain.

13. The method of claim 8, wherein retrieving, by the first microbot, the domain content from the first backend domain corresponding to the user query further comprises:
generating, by the first microbot, a prompt based on the user query and user data associated with the first client device, wherein the prompt is configured to elicit a response from the first backend domain;
transmitting, by the first microbot, the prompt to the first backend domain; and
receiving, by the first microbot, a domain response from the first backend domain, wherein the domain response comprises the domain content.

14. The method of claim 8, wherein determining, by the domain interface engine, the first microbot of the plurality of microbots for handling the user query further comprises:
determining, by the domain interface engine, a user intent based on the user query; and
selecting, by the domain interface engine, the first microbot of the plurality of microbots for handling the user query based on the user intent.

15. A non-transitory computer-readable storage medium comprising processor-executable instructions, wherein the processor-executable instructions comprise a domain interface engine configured to cause one or more processors to:
receive, via a virtual assistant application from a first client device, a user query from a first client device, wherein the domain interface engine:
is integrated with the virtual assistant application; and
comprises a plurality of microbots and each microbot of the plurality of microbots is assigned to a respective backend domain within a plurality of backend domains, wherein the plurality of backend domains are decoupled from the virtual assistant application;
determine a first microbot from a plurality of microbots for handling the user query, wherein:
each microbot of the plurality of microbots is assigned to a respective backend domain within a plurality of backend domains; and
the first microbot is assigned to a first backend domain;
retrieve domain content from the first backend domain corresponding to the user query;
generate a query response based on the domain content; and
transmit, to the first client device, the query response.

16. The non-transitory computer-readable storage medium of claim 15, wherein the processor-executable instructions of the domain interface engine to determine the first microbot from the plurality of microbots for handling the user query cause the one or more processors to further execute processor-executable instructions stored in the computer-readable storage medium to:
determine that the user query corresponds to domain content;
determine that the first backend domain comprises the domain content; and
assign the user query to the first microbot based on the domain content being in the first backend domain.

17. The non-transitory computer-readable storage medium of claim 15, wherein the processor-executable instructions of the domain interface engine to determine the first microbot from the plurality of microbots to handle the user query cause the one or more processors to further execute processor-executable instructions stored in the computer-readable storage medium to:
determine a user intent based on the user query; and
select the first microbot from the plurality of microbots based on the user intent.

18. The non-transitory computer-readable storage medium of claim 15, wherein:
the processor-executable instructions of the domain interface engine to retrieve the domain content from the first backend domain corresponding to the user query cause the one or more processors to further execute processor-executable instructions stored in the computer-readable storage medium to:

receive, from the first backend domain, a domain response from the first backend domain, wherein the domain response comprises the domain content; and the processor-executable instructions cause the one or more processors to further execute processor-executable instructions stored in the computer-readable storage medium to:

validate, by the first microbot, the domain response from the first backend domain, wherein validating the domain response comprises determining a degree of similarity between the domain content and the user query based on a similarity index.

19. The non-transitory computer-readable storage medium of claim 15, the processor-executable instructions cause the one or more processors to further execute processor-executable instructions stored in the computer-readable storage medium to:

filter, by the first microbot, the user query to remove restricted content from the user query prior to retrieving the domain content from the first backend domain.

20. The non-transitory computer-readable storage medium of claim 15, wherein:

the processor-executable instructions of the domain interface engine cause the one or more processors to further execute processor-executable instructions stored in the computer-readable storage medium to:

determine a user intent based on the user query; and the processor-executable instructions of the domain interface engine to determine the user intent based on the user query cause the one or more processors to further execute processor-executable instructions stored in the computer-readable storage medium to:

transmit a prompt to the first client device, wherein the prompt is configured to elicit a subsequent query from the first client device; and determine the user intent based on the subsequent query.

* * * * *